United States Patent [19]

Lem

[11] 4,249,661
[45] Feb. 10, 1981

[54] CONVEYOR SORTATION SYSTEM

[76] Inventor: Hans J. Lem, 185 Rte. 17, North, Mahwah, N.J. 07430

[21] Appl. No.: 914,155

[22] Filed: Jun. 9, 1978

[51] Int. Cl.³ .............................................. B65G 47/30
[52] U.S. Cl. .................................... 209/564; 209/934; 209/651; 198/367; 198/372
[58] Field of Search ............... 209/566, 934, 563, 564, 209/651, 565, 562, 559, 560, 561, 569, 583, 584; 198/367, 372, 440, 457

[56] References Cited

U.S. PATENT DOCUMENTS

| | | | |
|---|---|---|---|
| 3,170,572 | 2/1965 | Harrison | 209/563 |
| 3,955,678 | 5/1976 | Moyer | 209/564 |

*Primary Examiner*—Allen N. Knowles
*Attorney, Agent, or Firm*—William Nitkin

[57] ABSTRACT

The invention comprises one or more feed conveyors in communication with a sorting conveyor, so that items placed on the feed conveyors can be transferred to the sorting conveyor. Where more than one feed conveyor is used, their outputs are first run through a merge conveyor so that the outputs are compatible with use of a single sorting conveyor. A device for reading a code that has been placed on the item to be sorted is provided and a computing device to which such reader is connected is programmed to determine which diverter is to be activated by a particular code read by the reader. A timing device is provided that, when used in conjunction with the computing device, integrates the travel time of an item along the sorting conveyor to determine when the item has reached the particular diverter required to be activated to cause the item to be properly sorted. A control signal emanates from the computing device when the timer has completed its cycle and is used to switch on the pertinent diverter. Each diverter has two deflectors and an endless drive system to which the deflectors are attached in such a way as to cause them to move in a direction transverse to that of the sorting conveyor. The deflectors are mounted 180° away from each other on the endless drive system so that when one deflector has been used to cause a diversion in a particular direction, the other deflector is in place to be used for the next diversion.

12 Claims, 7 Drawing Figures

CONVEYOR SORTATION SYSTEM

BACKGROUND OF THE INVENTION

This invention pertains to conveyor systems, and in particular to those systems which provide a means for physically sorting items placed onto the system.

Conveyor sortation systems are common in the prior art. Conventionally sortation is accomplished by providing a reader to read a preprinted code on an item to be sorted that has been placed onto the conveyor system and thereafter activating an appropriate diverter located in the proximity of the reader to cause the item to be properly sorted. Numerous methods for encoding an item to be sorted have been employed, and items have been encoded not only with visible ink, but also, for example, magnetically. The code may be binary, color, digital, etc. Diverters exist in many forms, and include motor or air-driven cams capable of engaging again and driving the item to be sorted, submerged chain transfer devices that pop up to engage against items to be diverted, similarly acting submerged live roller diverters capable of popping up to engage the items to be diverted, and simple retractable powered pushing devices.

Generally, there are two kinds of limitations on the speed of conventional sortation conveyor systems. First, most diverters require a substantial recovery time to return to the position occupied prior to causing an item to be diverted. That is, the diverters are two-state devices, and after a command to cause a diversion, must take a substantial period of time to return to the original state in which they reposed prior to the command.

The diverter recovery time interacts with a second impediment to high-speed operation of the system, namely, the spacing of items on the system immediately prior to the time the items are subject to diversion. If the items are spaced too closely together, a given diverter may not recover in time to cause an item to be properly diverted. A common means of dealing with this problem has been to slow the conveyor system down to the point that effective diversion becomes possible. To the extent that one seeks to obtain high-speed sortation, one risks in the prior art ineffective sortation, jamming of diverters, and similar problems.

SUMMARY OF THE INVENTION

It is an object of the present invention to provide a conveyor sortation system capable of operating reliably at high speed.

Another object is to provide a system for creating and maintaining a uniform space between items to be sorted in such a way that the items can be sorted at maximum possible speed.

It is also an object of the invention to provide a conveyor sortation system in which the reading of a code on an item to be sorted can be accomplished prior to the point in the system where the item is proximate to any diverters, so that the operations of reading and sortation in the system can each be designed for maximum efficiency with comparatively little attention to their mutual interaction.

It is a further object of the present invention to provide a form of diverter that does not change state when it has caused an item to be diverted.

It is a further object of this invention to provide a diverter that requires a minimum of time to accomplish successive diversions of items in the system.

It is a further object of the present invention to maximize the efficiency with which diverters are utilized in sortation.

It is a further object of the invention to provide a means of sorting efficiently items that are uniformly spaced on a powered conveyor.

These and other objects of the invention are achieved by providing a sorting conveyor; a system of diverters, stationed at known intervals along the sorting conveyor, and capable of causing an item on the sorting conveyor to be directed to any of a number of different locations; a first means, for determining which, if any, diverter must be activated to cause an item to be properly sorted; a second means, responsive to the first means, for determining when the particular item has reached any diverter determined by the first means to be required to be activated to cause the item to be sorted properly; and a third means, responsive to the second means, for activating the pertinent diverter when the applicable item has reached the diverter.

In a preferred form, the invention comprises one or more feed conveyors in communication with the sorting conveyor, so that items placed on the feed conveyors can be transferred to the sorting conveyor. Where more than one feed conveyor is used, their outputs are first run through a merge conveyor or equivalent device so that the outputs are compatible with use of a single sorting conveyor. The first means in this embodiment comprises a means for reading a code that has been placed on the item to be sorted and a computing device to which the reader is connected that has been programmed to determine which diverter is to be activated by a particular code read by the reader. The second means comprises a timing device that, when used in conjunction with the computing device described previously, integrates that travel time of an item along the sorting conveyor to determine when the item has reached the particular diverter required to be activated to cause the item to be properly sorted. The third means is a control signal emanating from the computing device when the timer in the second means has completed its cycle and which is used to switch on the pertinent diverter. Preferably the diverters are stationed at equal intervals along the sorting conveyor and are of the novel type, described herein, that do not require any recycled time after they have been activated and caused an item to be sorted. In the computing device, and in conjunction with photocells or similar devices stationed at the beginning and end of the feed conveyor (i) the feed belt is operated only when necessary to receive another item to be sorted and (ii) the items are loaded onto the sorting conveyor with the minimum spacing necessary to cause them to be sorted properly.

Preferably each diverter comprises two deflectors and an endless drive system to which the deflectors are attached in such a way as to cause them to move in a direction transverse to that of the sorting conveyor. Preferably the deflectors are mounted 180° away from each other on the endless drive system so that when one deflector has been used to cause a diversion in a particular direction, the other deflector is in place to be used for the next diversion.

BRIEF DESCRIPTION OF THE DRAWINGS

These and other objects and features of the invention will be more readily understood from a consideration of the following detailed description, taken with the accompanying drawings, in which.

DESCRIPTION OF SPECIFIC EMBODIMENTS

Figure 1:
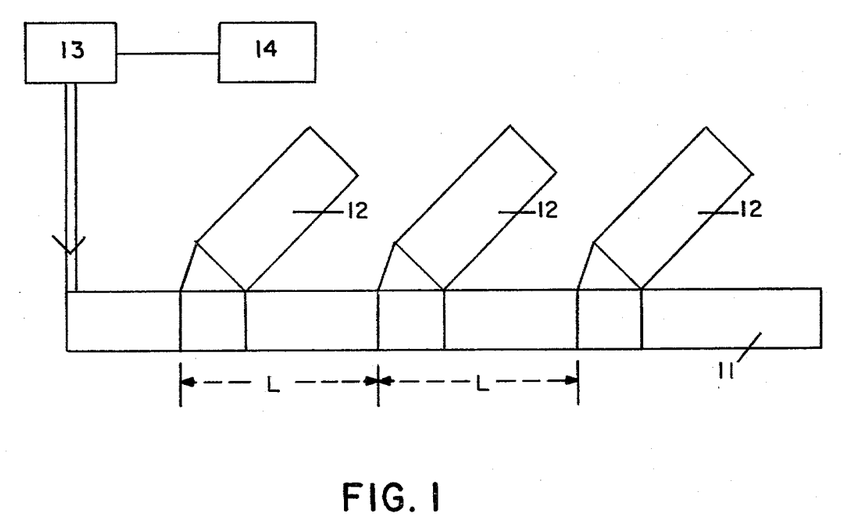
FIG. 1 is a schematic plan view of a rudimentary version of the invention.

Referring now to the particular embodiments of the invention shown in the drawings by way of example only, FIG. 1 illustrates the principle of operation of the invention. The sorting conveyor 11 is shown in plan view. At equal intervals along the conveyor are stationed diverters 12. The motion of the sorting conveyor is from left to right.

Prior to entry of an item onto the sorting conveyor, the code imprinted or otherwise affixed to the item is read by reading means 13.

The reading can be accomplished by any means familiar to the art, including reading of visible or magnetic codes appropriate for sortation. Where the code is affixed in known locations on the item, readers can be stationed appropriately to permit reading of an item regardless of its orientation. For example, assume that the item is a rectangular carton and further assume that it is known that the code does not appear on the front face or rear face of the carton as it travels along the conveyor system, but that the code appears at a known location on one or more of the other faces of the carton. Readers can be stationed at each side of and above the conveyor so as to read any code appearing on the top or two sides of the carton as it moves on the conveyor. If there is no code read as the item passes the readers (because the code appeared on the bottom of the carton) the item can be diverted to a place where it can be reoriented for proper reading, and then run through the system again.

The output from the reading means is sent to the computing and diverter activating means 14. Means 14 acts as appropriate on the diverters 12. Thus, it can be seen that an item entering onto the sorting conveyor will not be delayed by any activity in reading the item, but only by the activity of the diverters themselves on the item. When the item has reached the appropriate diverter 12, the action of means 13 and 14 will cause the diverter to divert the item.

Figure 2:
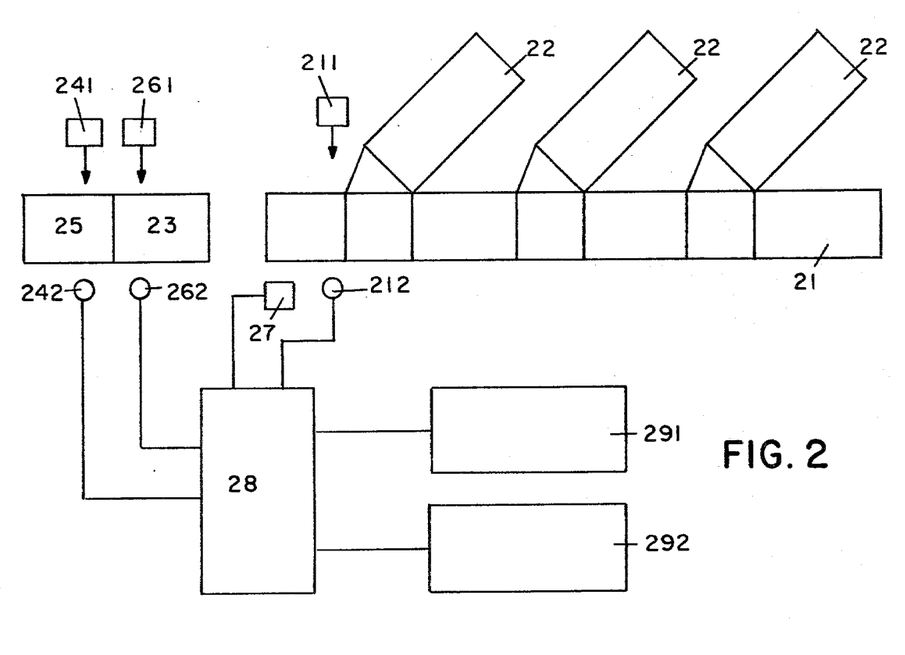
FIG. 2 is a schematic plan view of a slightly more sophisticated version of the invention.

FIG. 2 reveals the operation of the system in further detail. In this figure the sorting conveyor 21 and its diverter system 22 are preceded respectively by a feed conveyor 23 and a metering conveyor 25. Again as in FIG. 1, the motion of the conveyors is from left to right. An item at the end of the metering conveyor 25 and that is to come onto the feed conveyor 23 interrupts the path of light from the first source 241 to the first photocell 242. The event of the interruption is used to turn on the feed conveyor through its speed control 292 to cause the item to be loaded onto the feed conveyor and propelled along it. Upon entering onto the feed conveyor, the item interrupts the light path from a second source 261 to a second photocell 262. The duration between the interruption of the light path in the first source and photocell pair 241 and 242 on the one hand and the interruption of the light path in the second source and photocell pair 261 and 262 on the other hand is combined with information concerning the speed of the feed conveyor to permit the computer means 28 to determine the length of the item entering onto the feed conveyor. Once an item has entered onto the feed conveyor 23 as determined by the second source and photocell pair 261 and 262, the metering conveyor 25 is stopped unless and until there has been created an amount of space on the feed conveyor 23, after the item, sufficient to permit the item to be sorted in the process that follows. When this spacing has been achieved, the metering conveyor is again turned on unless and until a subsequent item reaches the end of the metering conveyor. The metering conveyor speed is controlled through use of metering conveyor speed control 292 that is acted upon by computer means 28. The presence of a subsequent item at the end of the metering conveyor will again interrupt the light path between source 241 and photocell 242 and cause the subsequent item to be loaded onto the feed conveyor in the manner just described.

The feed conveyor causes items to be loaded onto the sorting conveyor. After an item has been loaded onto the sorting conveyor, its code is also read by the reader 27 which, through the computer means 28, determines which of the diverters 22 is to be activated when the item reaches the diverter system. This information is stored in the computer means 28 which keeps track of the time the sorting conveyor has operated to advance the item toward the proper diverter, and when the item has reached this diverter, the diverter is activated by diverter activating means 291 that is responsive to computer means 28. The final synchronization of an item to be sorted with respect to a particular diverter is accomplished by third light source 211 and third photocell 212, which report to computer means 28 the presence of an item to be sorted at a specified location near the beginning of the sorting conveyor. When all items from the feed conveyor have been sorted, the sorting conveyor stops.

Figure 3:
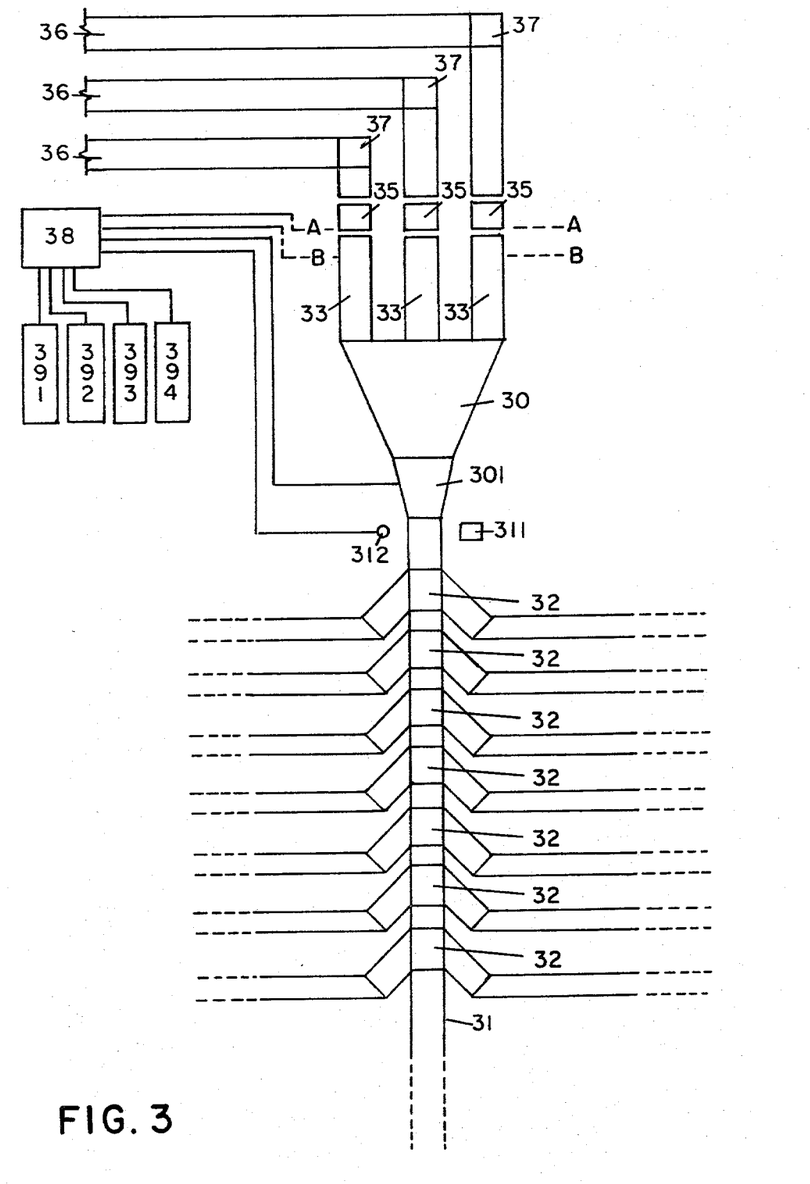
FIG. 3 is a schematic plan view of a preferred embodiment of the invention.

FIG. 3 shows a preferred embodiment of the system. The sorting conveyor 31 is fitted with a diverter system 32. Three feed conveyors 33 feed the sorting conveyor 31 through a merge conveyor 30. (There are numerous devices capable of operating as equivalents in function and application as merge conveyors including: a right angle transfer, 90° live roller curve, and fixed deflector merge conveyor. For simplicity, any such device is herein referred to as a "merge conveyor.") A portion 301 of the merge conveyor 30, occurring at a point after the items entering from the three feed conveyors 33 have been merged into a single line of items, is dedicated to reading of a designated code on the items to be sorted. Prior to each feed conveyor 33 is a metering conveyor 35.

At the end of each of the metering conveyors 35 there is stationed a first light source and photocell pair similar to the pair 241 and 242 shown in FIG. 2. These devices are located generally along the line shown in FIG. 3 as A—A. Similarly, at the beginning of each of the feed conveyors 33 there is stationed a second light source and photocell pair similar to the pair 261 and 262 shown in FIG. 2. These devices are located generally along the line shown in FIG. 3 as B—B. Finally, light source and photocell pair 311 and 312 similar to the pair 211 and 212 shown in FIG. 1 are located along the beginning of sorting conveyor 31. The outputs from all these devices are fed to computer means 38 which controls, through means 391, 392, 393, and 394 respectively, the actuation of the diverter system, the speeds of the respective metering conveyors, the speeds of the respective feed conveyors, and the speed of the sorting conveyor. The speeds of the conveyors (particularly the metering conveyors, which are subject to frequent starts and stops) are most quickly and effectively controlled when these conveyors are driven by D.C. regenerative motors.

The metering conveyors 35 are supplied with items by a system of source conveyors 36 that run continuously. For simplicity and operation of the system, the source conveyors are brought close to one another through the operation of right angle transfers 37. These transfers are used to make the feed conveyors proximate each other for facilitating use of the merge conveyor 35 in causing items to be fed onto the single sorting conveyor 31.

In general the operation of this system is similar to the operation of the system shown in FIG. 2. Each feed conveyor 33 and its corresponding metering conveyor 35 operate cooperatively in the same fashion as described in connection with FIG. 2; means 391 controls each metering conveyor independently of each other metering conveyor. The reading position 301 of the merge conveyor functions in the same manner as reader 27 discussed in FIG. 2; and the source and photocell pair 311 and 312, the sorting conveyor 31, and the diverter 32 all function in the same manner as their counterparts in FIG. 2. The system of FIG. 3 differs from the system of FIG. 2, however, in that the load from three feed conveyors 33, rather than a single feed conveyor, must be merged onto a single sorting conveyor. Thus the computer means 38 must be programmed to cause the merge conveyor 30 to receive items as they reach the end of each of the feed conveyors 33. Several methods can be used successively to program the emptying of the feed conveyors. One method is to cause the merge conveyor to receive alternately one item from each of the feed conveyors in succession; another method is to empty each feed conveyor when it is full.

In a preferred embodiment, the computer means 38 can be programmed to designate the conveyor line, comprising a particular feed conveyor 33 and the metering conveyor 35 and source conveyor 36 that supply this feed conveyor, as a "priority line." Similarly the computer means can be programmed to designate the conveyor line comprising a different feed conveyor 33, with the metering conveyor and source conveyor supplying it, as a "second priority line"; and the third feed conveyor, with its metering conveyor and source conveyor, as a "third priority line." These designations are used to have the system operate as follows. Under control of computer means 38, and in particular, means 391, 392, 393, and 394, the priority line operates to supply items to the merge conveyor 30. Owing to lack of continuous supply of items at the pertinent source conveyor, the computer means 38 determines (on the basis of information provided by the pairs of photocells and sources at the specified metering and feed conveyors) whether the spacing until the next item appears at the output of the priority line is more than the specified minimum for effective sorting. If the spacing is more than this specified minimum, the computer means then determines whether an item is presently available from the second priority line to be transmitted onto the merge conveyor 30 before the next item on the priority line is "scheduled" to arrive; if an item is available and its transmission to the merge conveyor will not preclude having the specified minimum spacing between items, then the second priority line is operated to cause the item to be transmitted onto the merge conveyor 30. If no item is presently available from the second priority line meeting these criteria, the same criteria are applied to the third priority line; if an item is available from the third priority line meeting these criteria, then the third priority line is operated to cause the item to be transmitted onto the merge conveyor 30. If neither the second nor third priority lines meet these criteria, then the flow of items off of the priority line is momentarily interrupted for a time sufficient to permit an item to be transmitted from the second priority line onto the merge conveyor with the specified minimum spacing for effective sorting. Also in a preferred embodiment of the invention, the end of the sorting conveyor is in communication with a conveyor to cause recirculation through the system of any items that cannot be effectively sorted, owing to a clogged chute area following a diverter, or a diverter malfunction, or failure to obtain a reading of the code on an item. Also in a preferred embodiment of the invention having a recirculation conveyor to avoid back-up on the recirculation conveyor, when it is determined photo-electrically that a back-up condition is about to occur, every other item otherwise scheduled by the computer means 38 for recirculation is diverted to an error chute, which is preferably at the last diverter station before the recirculation conveyor. Also, in a preferred embodiment of the invention, as a safety feature, if the system is stopped either by the computer means 38 or manually, it cannot be restarted except by manual input to the computer means.

Typically, the feed conveyors and sorting conveyors are each capable of operating at at least dual speeds of 180–360 feet/minute. When the feed conveyors are operating at 180 feet/minute and are carrying a relatively large number of items, for example, the sorting conveyor may be running, under control of the computer means 38, at 360 feet/minute.

Figure 4:
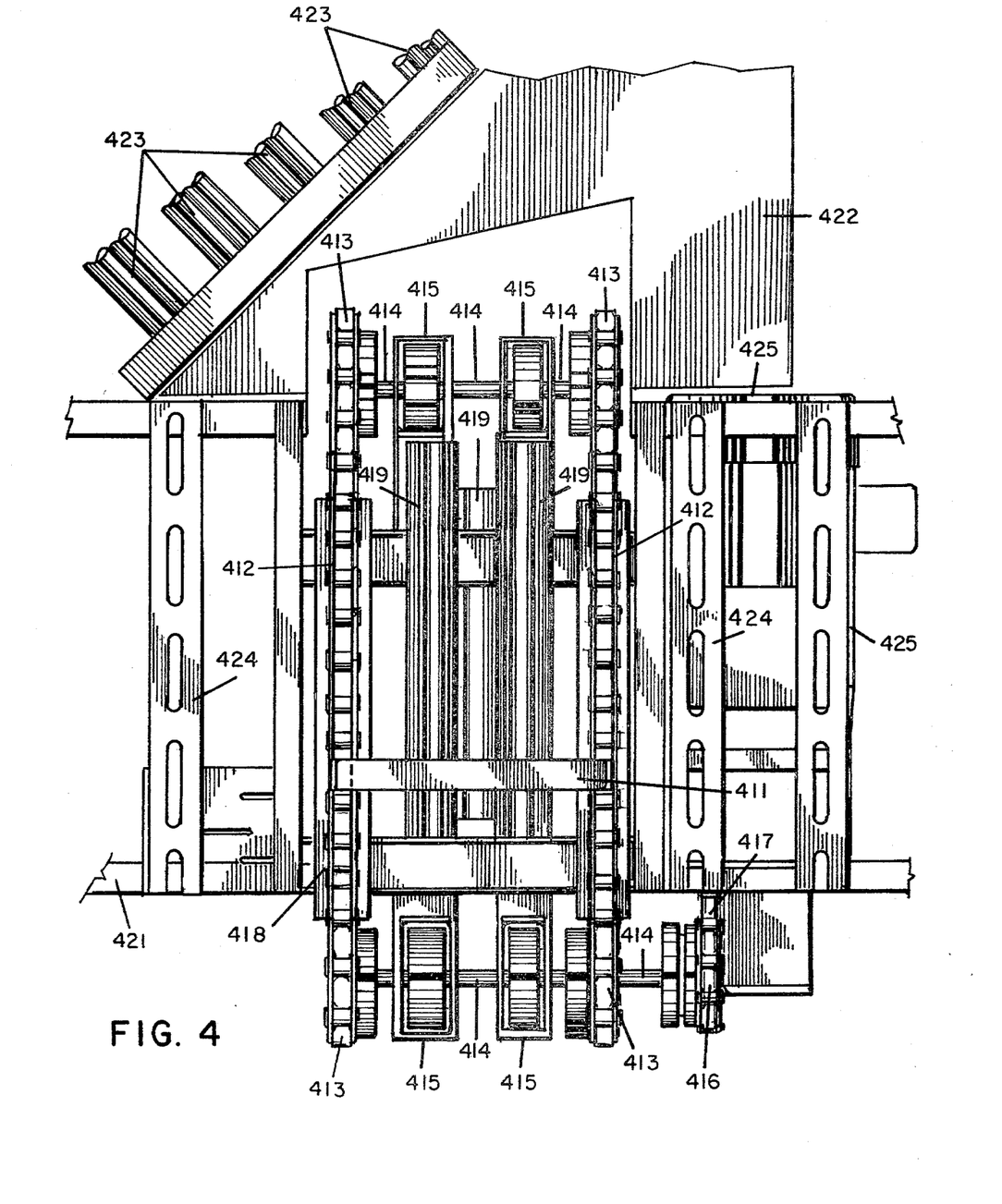
FIG. 4 shows a horizontal section of a preferred embodiment of the diverter employed in the present invention as installed in a conveyor system.

The operation of the preferred embodiment of the diverter employed by the invention is shown in FIGS. 4–7. In FIG. 4 there is shown the diverter as installed in a conveyor system. The conveyor frame 421 is used to mount the diverter, in conjunction with mounting brackets 424. The normal flow of items over the conveyor is from the right to left. Operation of the diverter causes a deflector 411 to push the item across (up, in FIG. 4) the conveyor system so as to land on a chute platform, comprising a plate 422 inclined downwardly from the frame 421 that is coplanar with the chute roller system 423.

Still, in reference to FIG. 4, the deflector 411 is driven across the conveyor system by a chain drive 412 comprising two parallel chain belts to which the deflector is connected. A second deflector, not appearing in this Figure is located 180° apart from the deflector shown. The pair of deflectors 411 are shown together in FIG. 7. The drive chains 412 are mounted and actuated through use of drive sprockets 413. Two sprockets are used for each chain belt. The chain belt is also supported by polyethylene slide strips 418, which are located immediately below the upper portion of each of the chain belts and between the respective pairs of drive sprockets. The two drive sprockets 413 on each side of the frame 421 share in each case a common axle 414. The axles are mounted by bushing assemblies 415 to the frame 421. One of the axles, appearing in the bottom portion of the Figure, is attached to a power sprocket 416, which through a power chain belt and a reducer 417 is driven by a regenerative D.C. motor 425. The motor is mounted by two brackets 424.

FIG. 4 also shows rollers 419 which are used as part of the conveyor system in its normal conveyance of items along the system. The level of the drive chains 412 and polyethylene slide strips with respect to the rollers 419 is such that the drive chains do not impede the progress of an item along the system.

Figure 5:
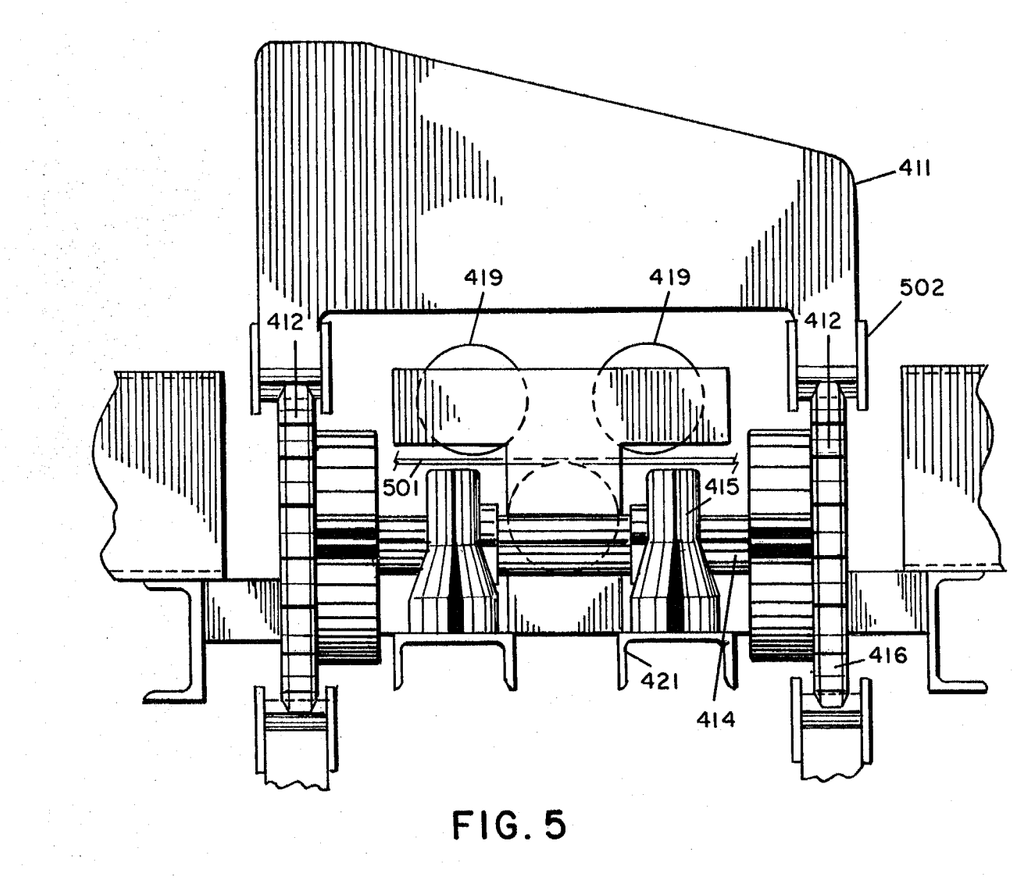
FIG. 5 is a partial vertical sectional view through the plane A—A of the same diverter shown in FIG. 4.

The relative heights of the drive chains 412 can be better seen in FIG. 5. There is a vertical sectional view, it can be seen that the drive chains 412 are not as high as those of the rollers 419 that come in contact with the items being conveyed. The drive chain mounts 502 used to attach the deflector 411 to the drive chain do not protrude into the normal passageway for items being conveyed when the diverter is not in operation. FIG. 5 also shows the belt 501 used to drive the rollers 419 and the mounting assembly for the drive chains comprising sprockets 416, axle 414, and bushings 415, the latter of which are attached to the conveyor frame 421.

Figure 6:
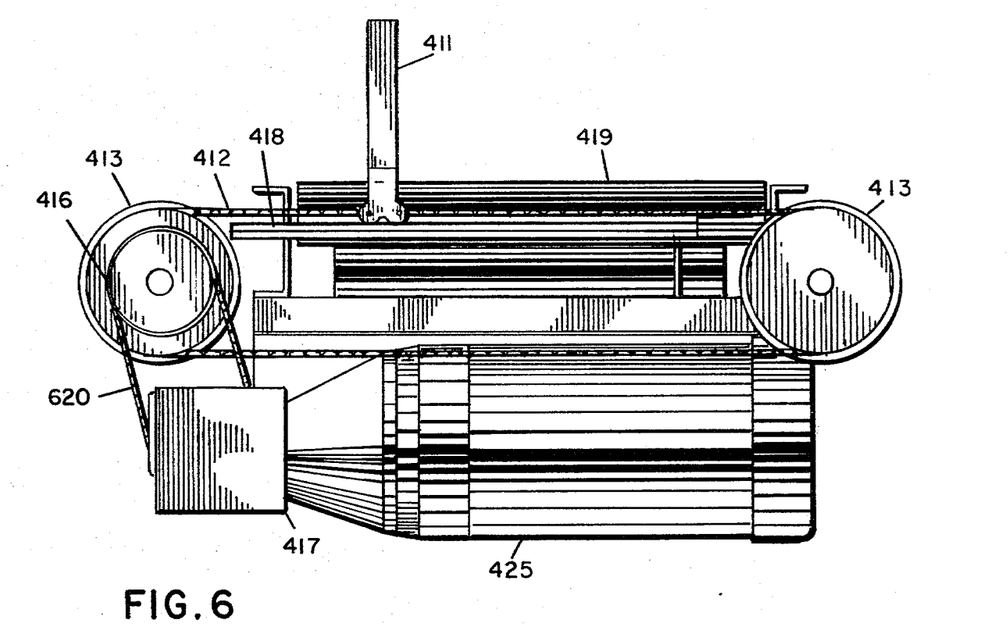
FIG. 6 is a vertical sectional view of the diverter shown in FIG. 4 taken through the plane B—B.

FIG. 6 shows the relation of the motor 425, reducer 417, power chain 620, and the drive chain system. The power chain 620 drives the power sprocket 416 and is driven by the reducer 417. This Figure also shows clearly the spatial relationship between the drive chain 412 and rollers 419. Other features shown are the slide strip 418, the drive sprockets 413, and the deflector 411.

Figure 7:
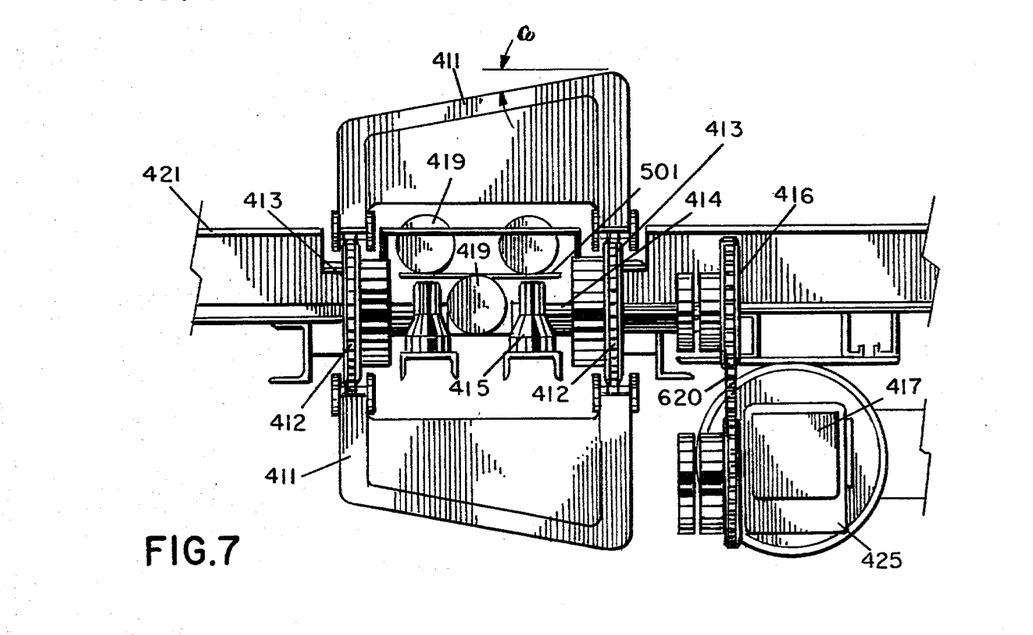
FIG. 7 is a vertical sectional view of the diverter in FIG. 4 taken through plane C—C.

FIG. 7 is a vertical sectional view similar to that of FIG. 5. As in FIG. 5 there are shown the rollers 419, the belt 501, the bushings 415, axle 414, and drive sprocket 413. Also shown, however, in the relation to these items of the power sprocket 416, power chain 620, reducer 417, and motor 425.

Finally, FIG. 7 shows both deflectors 411. It should be noted that, as shown in FIG. 7, the upper edge of the upper deflector and the lower edge of the lower deflector are skewed with respect to a line parallel to the normal horizontal flow of items on the conveyor system. If there were no skew whatever, then the deflector would resemble a rectangular plate, and when driven by the motor drive chain assembly would simply push an object at right angles to the normal conveyor flow path as discussed in connection with FIG. 4 above.

Where, as here, there is a skew angle, indicated as the angle alpha in FIG. 7, so that the outer edge of the deflector is not parallel to the flow path, then it will cause certain items to be deflected at an angle other than 90° from the flow path. If, for example, the item to be diverted is packaged in a carton having at least one side that is higher than the deflector 411, and if such side is the side that is the side on which the deflector pushes to divert the item, then the item will be pushed at 90° to the normal flow path along the conveyor. When, however, the deflector reaches a position approximately over the axle 414 shown in the upper portion of FIG. 4, the carton will have traveled part way down the chute 422 and its vertical wall will be in contact with the upper edge of the deflector. Because of the skew angle alpha, the carton at this point will be pushed over a greater distance by the right-hand portion of the deflector than by the left-hand portion of the deflector. Therefore the deflector will cause the carton to deviate from its former motion which was perpendicular to the conveyor flow path. In particular, with reference to FIG. 4, the diverter would initially push such a carton "up," then as the diverter nears a position over the "upper" axle 414, the carton is pushed somewhat to the "left," until it reaches the chute roller system 423, where gravity and friction cause the carton to go down the roller system.

In operation, after one of the deflectors 411 has caused the item to be diverted, the motor can be shut down quickly by a sensing means stationed to detect the presence of a deflector in the vicinity of the axle 414. Since there are two deflectors, the second deflector will already be in position for causing diversion of the next item to be diverted.

Accordingly, while the invention has been described with particular reference to specific embodiments thereof in the interest of complete definiteness, it will be understood that the invention may be embodied in a variety of forms diverse from those shown and described without departing from the spirit and scope of the invention as defined by the following claims.

I claim:

1. A conveyor system, for directing an item placed onto the system to a particular one of a number of different locations, comprising:
   a sorting conveyor capable of receiving items placed onto the system;
   a system of at least one diverter stationed at known interval(s) along and from a known point on the sorting conveyor, and capable of causing an item on the sorting conveyor to be directed to any of a plurality of different locations;
   a first sorting means, for determining which, if any, diverter must be activated to cause a particular item which has been placed on the sorting conveyor to be directed to a particular location desired for such item;
   a second sorting means, responsive to the first sorting means, for determining when the item upon which the first means has operated has reached any diverter determined by the first means to be required to be activated to cause the item to be directed to the desired location;
   a third sorting means, responsive to the second means, for activating the pertinent diverter when the particular item has reached the diverter;
   wherein the second sorting means includes:
      a fourth sorting means, for sensing the presence of an item at the beginning of the sorting conveyor;
      a timer for timing an interval, dependent on the definite integral of the sorting conveyor speed over time, that is commenced by sensing by the fourth sorting means of an item and that continues until the sorting conveyor has carried, to the pertinent diverter, the item which the fourth sorting means has sensed;
   wherein the system of diverters comprises diverters that are stationed a uniform distance L between one another along the sort conveyor;

a feed conveyor in communication with the sorting conveyor, so that items placed on the feed conveyor can be transferred to the sorting conveyor;

a first feeding means, for sensing the presence, at the beginning of the feed conveyor, of an item to be sorted; and a second feeding means, responsive to the first feeding means, for controlling the speed of the feed conveyor and thus entry of an item onto the sorting conveyor so that the feed conveyor is capable of receiving items one after another at desired spacing intervals wherein the first feeding means comprises means for optical detection of an item, said optical detection means including a light source, aimed transversely to the flow path along the feed conveyor and stationed near the beginning of flow along the feed conveyor;

a fifth sorting means, responsive to the fourth sorting means, for controlling the speed of the sorting conveyor and the entry of an item onto the sorting conveyor, so that the sorting conveyor need be operated only when necessary.

2. The system of claim 1, wherein the fifth sorting means is also responsive to the first feeding means and includes a computer means, so that the sorting conveyor can be operated at optimum speeds for various quantities and spacings of items in the conveyor system.

3. The system of claim 1, further comprising:

a metering conveyor in communication with the feed conveyor, so that an item placed on the metering conveyor can be transferred to the feed conveyor and thereupon to the sorting conveyor;

metering means, for sensing the presence of an item at the end of the metering conveyor; and third feeding means, responsive to the metering means and the first feeding means for determining the length of space an item occupies on the conveyor system.

4. A conveyor system, for directing an item placed onto the system to a particular one of a number of different locations, comprising:

a sorting conveyor capable of receiving items placed onto the system;

a system of at least one diverter stationed at known interval(s) along and from a known point on the sorting conveyor, and capable of causing an item on the sorting conveyor to be directed to any of a plurality of different locations;

a first sorting means, for determining which, if any, diverter must be activated to cause a particular item which has been placed on the sorting conveyor to be directed to a particular location desired for such item;

a second sorting means, responsive to the first sorting means, for determining when the item upon which the first means has operated has reached any diverter determined by the first means to be required to be activated to cause the item to be directed to the desired location;

a third sorting means, responsive to the second means, for activating the pertinent diverter when the particular item has reached the diverter, wherein the second sorting means comprises:

a fourth sorting means, for sensing the presence of an item at the beginning of the sorting conveyor;

a timer for timing an interval, dependent on the definite integral of the sorting conveyor speed over time, that is commenced by sensing by the fourth sorting means of an item and that continues until the sorting conveyor has carried, to the pertinent diverter, the item which the fourth sorting means has sensed;

wherein the system of diverters comprises diverters that are stationed a uniform distance L between one another along the sort conveyor;

a feed conveyor in communication with the sorting conveyor, so that items placed on the feed conveyor can be transferred to the sorting conveyor;

a first feeding means, for sensing the presence, at the beginning of the feed conveyor, of an item to be sorted;

a second feeding means, responsive to the first feeding means, for controlling the speed of the feed conveyor and thus entry of an item onto the sorting conveyor so that the feed conveyor is capable of receiving items one after another at desired spacing intervals;

wherein the sorting conveyor comprises means for moving items placed on it at a substantially constant speed; the first sorting means comprises a means for determining k, the number of times an item must traverse the distance L in order to reach the pertinent diverter; and the timer comprises a counter for counting, while the sorting conveyor is in operation, k times the time interval over which the sorting conveyor would move an item the distance L.

5. The system of claim 4 wherein the feed conveyor is driven by at least one D.C. regenerative motor.

6. The system of claim 4 wherein the sorting conveyor is driven by at least one D.C. regenerative motor.

7. The system of claim 4 wherein the metering conveyor is driven by at least one D.C. regenerative motor.

8. A conveyor system, for directing an item placed onto the system to a particular one of a number of different locations, comprising:

a sorting conveyor capable of receiving items placed onto the system;

a system of at least one diverter stationed at known interval(s) along and from a known point on the sorting conveyor, and capable of causing an item on the sorting conveyor to be directed to any of a plurality of different locations;

a first sorting means, for determining which, if any, diverter must be activated to cause a particular item which has been placed on the sorting conveyor to be directed to a particular location desired for such item;

a second sorting means, responsive to the first sorting means, for determining when the item upon which the first means has operated has reached any diverter determined by the first means to be required to be activated to cause the item to be directed to the desired location;

a third sorting means, responsive to the second means, for activating the pertinent diverter when the particular item has reached the diverter;

wherein the second sorting means includes:

a fourth sorting means, for sensing the presence of an item at the beginning of the sorting conveyor;

a timer for timing an interval, dependent on the definite integral of the sorting conveyor speed over time, that is commenced by sensing by the fourth sorting means of an item and that continues until the sorting conveyor has carried, to the pertinent diverter, the item which the fourth sorting means has sensed;

wherein the system of diverters comprises diverters that are stationed a uniform distance L between one another along the sort conveyor;

an array of not less than two feed conveyors;

a merge conveyor having one end in communication with the array, and the other end in communication with the sorting conveyor, so that an item placed on any metering conveyor in the array will be transferred in turn to a feed conveyor, the merge conveyor, and to the sorting conveyor;

a first feeding means, on each feed conveyor, for sensing the presence, at the beginning of each feed conveyor, of an item to be sorted;

a second feeding means, for determining when an item on a given feed conveyor in the array shall be transferred to the merge conveyor, and thereby onto the sorting conveyor;

a fourth feeding means on each feed conveyor responsive to the first feeding means, for controlling the speed of each feed conveyor and the entry of an item onto each feed conveyor so that each feed conveyor is capable of receiving and delivering items one after another at desired spacing intervals;

a metering means on each metering conveyor for sensing the presence of an item at the end of the metering conveyor; and a third feeding means, responsive to the metering means and the first feeding means, for determining the length of space an item occupies on the conveyor system.

9. A diverter comprising:

an endless drive system, mounted on a conveyor from which items are to be diverted, and capable of moving an object attached to the drive system in a direction transverse to the direction of motion of an item on the conveyor system; and a deflector attached to the endless drive system, for moving an item in a direction transverse to the motion of an item on the conveyor;

wherein the deflector's end located opposite the end attached to the endless drive system bears an angle to the plane of the conveyor when the deflector is vertical with respect thereto, so that the deflector is capable of moving certain items to be sorted at an angle.

10. The diverter of claim 9 in which the endless drive system is powered by a D.C. regenerative motor.

11. A diverter comprising:

an endless drive system, mounted on a conveyor from which items are to be diverted, and capable of moving an object attached to the drive system in a direction transverse to the direction of motion of an item on the conveyor system;

a first deflector attached to the endless drive system, for moving an item in a direction transverse to the motion of an item on the conveyor;

a second deflector attached to the endless drive system 180° away from the first deflector; and in which said endless drive system is powered by a D.C. regenerative motor.

12. The diverter system of claim 11, further comprising:

means for detecting when the deflectors are properly positioned for non-interference with the conveyor's normal flow path; and means for precluding the D.C. regenerative motor from being turned off except when the deflectors are thus properly positioned.

* * * * *